Jan. 9, 1923.
K. MUKAI.
COMBINED WOOD CUTTING AND SPLITTING MACHINE.
FILED JULY 1, 1922.
1,441,996.
3 SHEETS—SHEET 3.
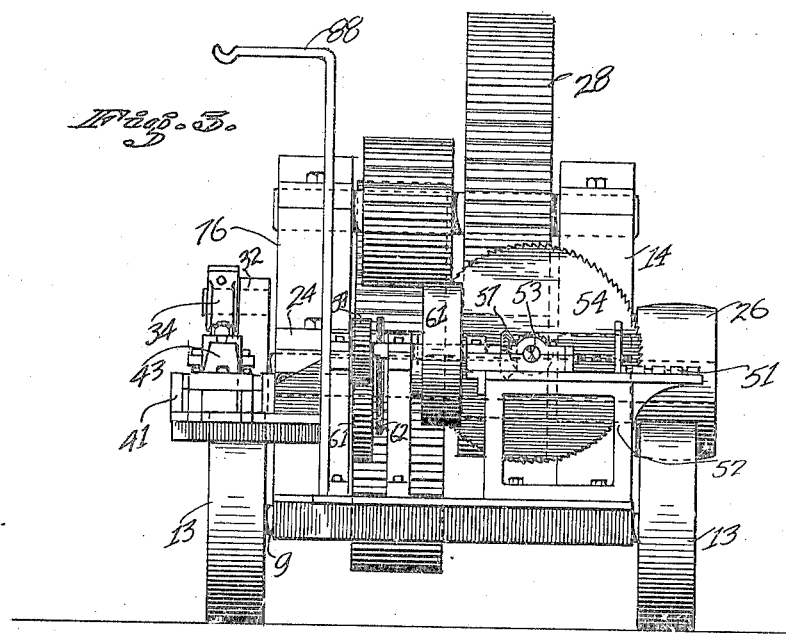
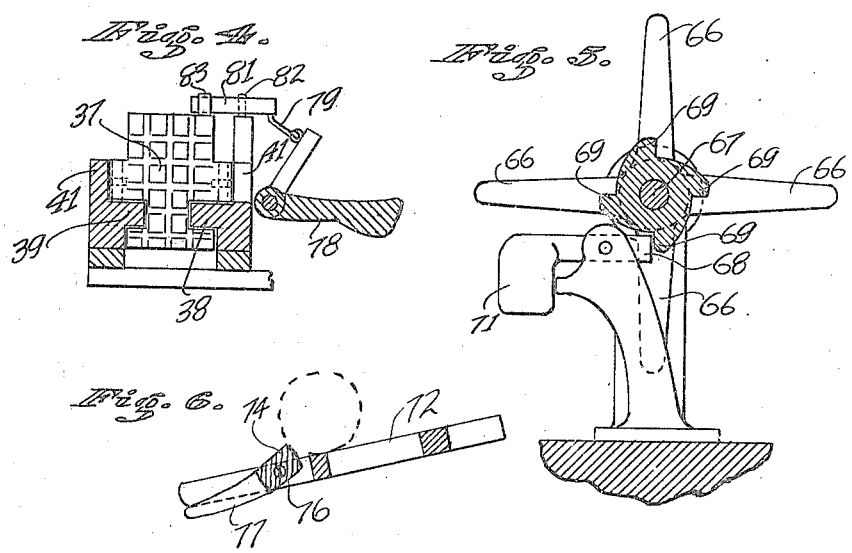
Inventor
K. Mukai
By Victor J. Evans
Attorneys.

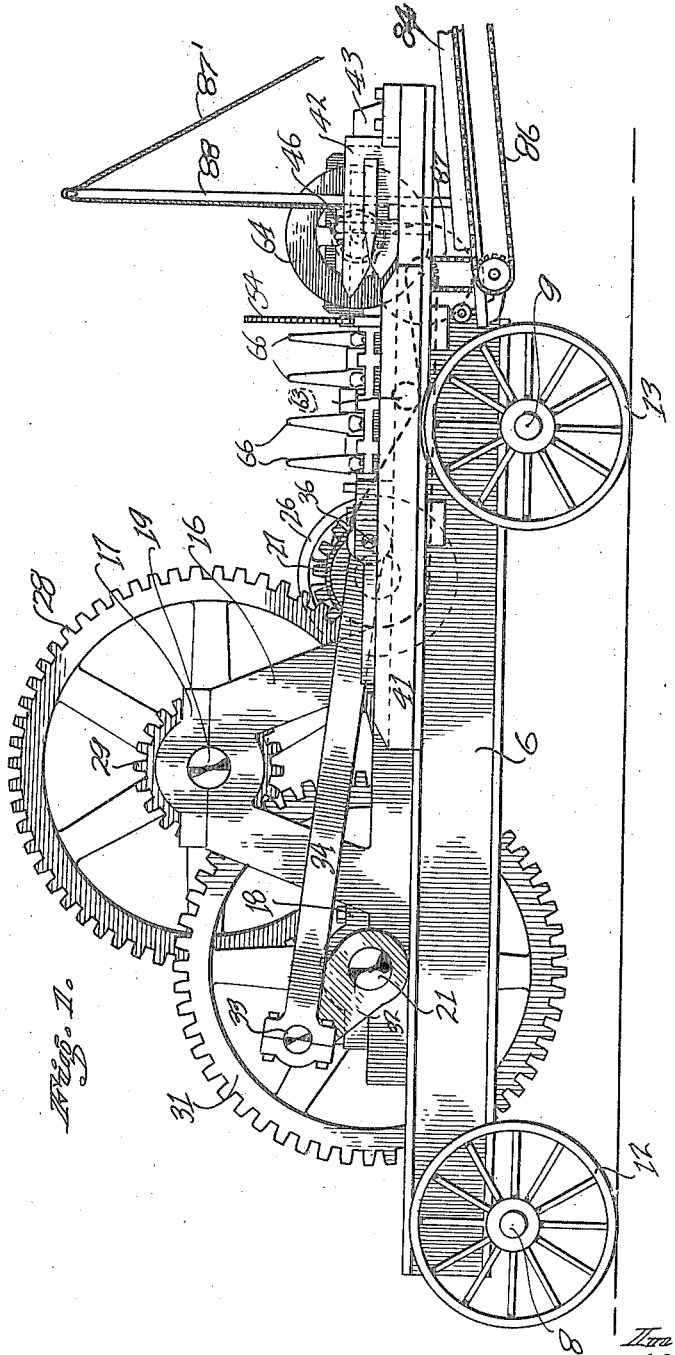

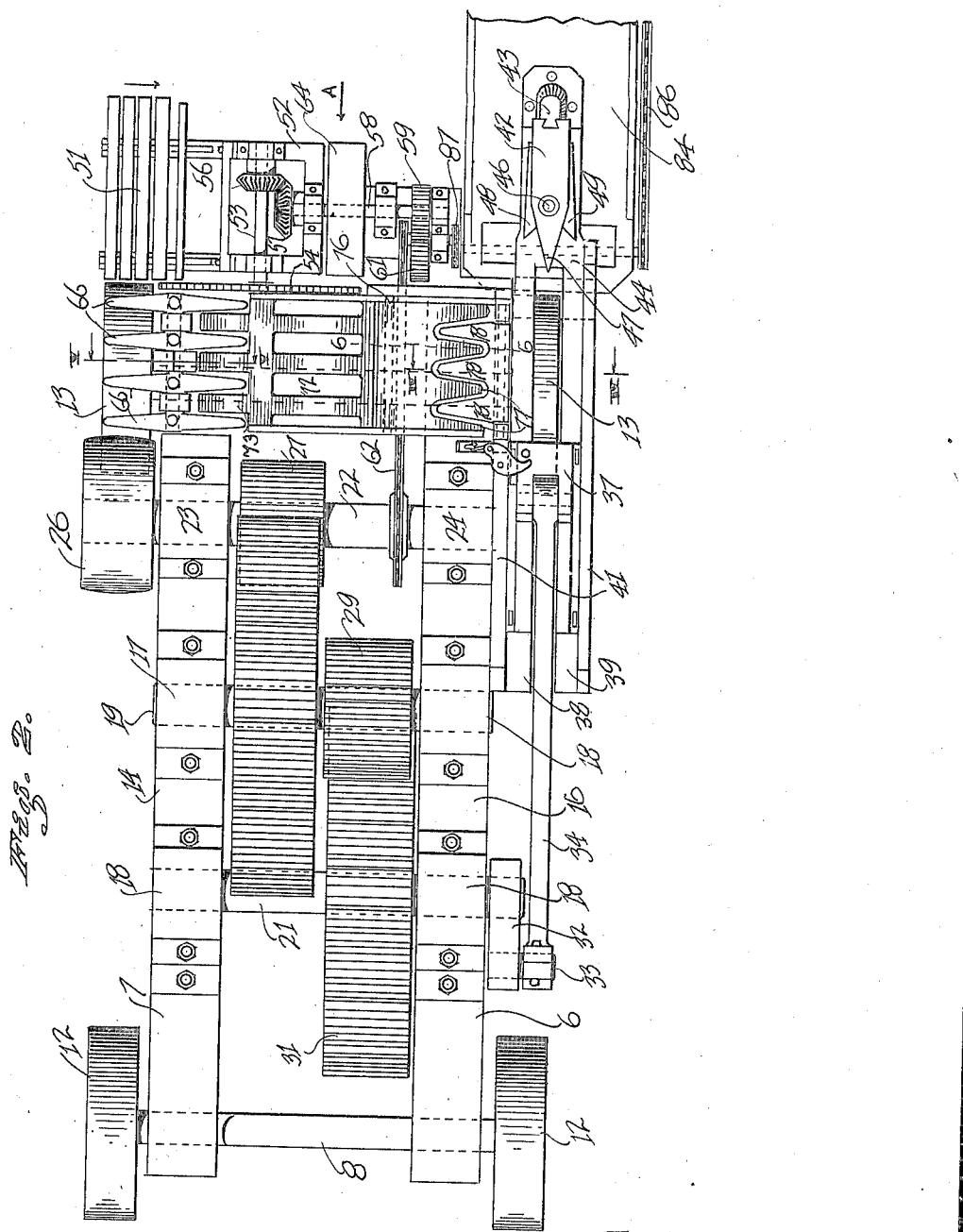

Patented Jan. 9, 1923.

1,441,996

UNITED STATES PATENT OFFICE.

KICHIMATSU MUKAI, OF SAN FRANCISCO, CALIFORNIA.

COMBINED WOOD CUTTING AND SPLITTING MACHINE.

Application filed July 1, 1922. Serial No. 572,160.

*To all whom it may concern:*

Be it known that I, KICHIMATSU MUKAI, a subject of the Emperor of Japan, residing at San Francisco, in the county of San Francisco and State of California, have invented new and useful Improvements in Combined Wood Cutting and Splitting Machines, of which the following is a specification.

This invention relates to improvements in combined wood sawing and splitting machines, and has for its principal object to produce a machine which will saw logs into short lengths and deliver the same to an automatic mechanism, which mechanism will in turn split the sawed lengths.

Another object is to provide means for removing the split wood from the machine to a distant point.

Another object is to provide means for preventing the feeding of sawed lengths of wood to the splitting mechanism except at predetermined intervals.

A further object is to provide means whereby the splitting implement may be readily removed and replaced when desired.

A still further object is to provide means for transporting the device from place to place, and further to provide means for minimizing the labor incident to sawing and splitting.

Other objects and advantages will be apparent during the course of the following description.

In the accompanying drawings forming a part of this specification, and in which like numerals are employed to designate like parts throughout the same, Figure 1 is a side elevation of my improved device, Figure 2 is a top plan view of Figure 1, Figure 3 is an end elevation of Figure 1 looking in the direction of the arrow A of Figure 2, Figure 4 is a cross-section taken on the line 4—4 of Figure 2, Figure 5 is a cross-section taken on the line 5—5 of Figure 2, and Figure 6 is a detail cross-section taken on the line 6—6 of Figure 2.

At the present time, as far as applicant is aware, wood is first sawed into appropriate lengths by a circular or band saw, after which it is piled up and later is split with axes or wedges. This means that there is a great deal of unnecessary handling which, due to the high cost of labor, is almost prohibitive.

I propose to overcome this difficulty of handling the logs more than once during the process of sawing and splitting, thereby causing a large saving in cost of producing split wood. This object I accomplish by providing a unitary machine which receives the logs and saws off a portion, which portion passes to a splitting element, is split and then delivered to a point remote from the machine.

By now referring to Figures 1, 2 and 3 it will be noted that I have mounted my device upon a truck, which truck is provided with I beams 6 and 7 extending the length of the vehicle. These I beams are supported as by axles 8 and 9 upon which wheels 12 and 13 are mounted. This truck forms no part of my invention and is merely a means for transporting my device.

Upon the I beams 6 and 7 are mounted suitable supports as shown at 14 and 16. These supports in turn carry bearings 17 and 18 which form journals for shafts 19 and 21. A shaft 22 is journaled in bearings 23 and 24 also carried upon the supports 14 and 16, which shaft 22 will be hereinafter termed the power shaft and carries a pulley 26 at its outer extremity, as best shown in Figures 2 and 3. Mounted upon the shaft 22 and at a point between the bearings 23 and 24, is a gear 27, which gear is adapted to mesh with a gear 28 mounted upon the shaft 19. A gear 29 is also mounted upon the shaft 19 and is adapted to mesh with a gear 31 secured upon the shaft 21. This shaft 21 carries a crank 32 upon its outer end, which crank is provided with the usual crank pin 33 to which a pitman rod 34 is secured. The free end of this pitman rod 34 is pivoted as at 36 to a sliding pusher 37. This pusher is provided with suitable rollers and travels on tracks 38 and 39, which tracks are provided with side rails as shown at 41 in order that the pusher may be properly guided.

By referring to Figure 2, it will be noted that the tracks 38 and 39 are joined as shown at 44 so as to form a support for a splitting element 42 which splitting element is secured thereto as by a bolt 46 passing therethrough and by a dovetailed connection with a block 43. This splitting element is preferably formed of a vertical wedge portion 47 and with horizontal side wedges as shown at 48 and 49, the result being that as a block of wood is pushed against the splitting element, it will first receive a vertical split and then a horizontal split. By having the horizontal wedges to the rear of the vertical wedges, the result is that the entire splitting does not take place at one time and consequently a better distribution of power may be secured.
In order to feed appropriate lengths of wood to the splitting device as just described, I provide a table 51, which table is movable in the direction indicated by the arrow adjacent thereto. This table is supported upon a suitable frame work 52 which also provides support for a shaft 53, upon one end of which is mounted a circular saw 54. This saw is adapted to be in line with one edge of the table 51 as best shown in Figure 2, and is in turn driven through the medium of a bevel gear 56 which meshes with a gear 57 mounted upon a shaft 58. Power for rotating the shaft 58 is secured through the medium of gears 59 and 61 and a chain 62 connected thereto, which extends to and around a sprocket mounted upon the shaft 22. The course of this chain is best shown in dotted lines in Figure 1 where it will be noted that the same passes beneath an idler
63. A balance wheel 64 is mounted upon the shaft 58 for obvious reasons.

By now referring to Figure 5, it will be noted that I have provided a rotatable rack composed of a series of fingers 66 in parallel alignment as best shown in Figures 1 and 2. These fingers are radially disposed about a shaft 67 journaled upon a suitable support. It will be noted that this rack is in line with the table 51 so that as a log is laid upon the table 51, the portion to be sawed off will lie upon the rack or fingers 66. In order to prevent retrograde movement of these fingers, I provide a latch comprising a pivoted dog 68, the nose of which is adapted to contact ratchet teeth 69 mounted between two of the fingers and upon the shaft 67. A weight 71 serves to maintain this latch in contact with the ratchet teeth. At 72 I have shown a grid having fingers 73 extending between the fingers 66 so as to receive the cut off logs therefrom and to deliver them to the pusher. As this grid is placed upon a slant, the logs will naturally roll to the lower side and will abut the stop 74 as shown in Figure 6. This stop is pivoted as shown at 76 and is provided with fingers 77 which fingers protrude between fingers 78 of the feeding mechanism. This feeding mechanism is pivoted adjacent the side rail 41 of the track 38 and is connected through the medium of a link 79, secured to a cam 81, pivoted as at 82 and adapted to be contacted by a pin 83 mounted upon the pusher 37.

In order to convey the split material away from the device I provide a conveyer 84 of the conventional type which conveyer is driven by a chain 86 passing over pulleys at both ends of the conveyer, the power for which is furnished by a belt 87 as shown in Figure 1. The outer extremity of this conveyer may be raised and lowered by a cable 87' passing over a vertical support 88.

The operation of my device is as follows:—

A log is placed upon the table 51 and moved lengthwise so that a portion overlies the fingers 66. The table 51 is then moved so as to cause the saw 54 to sever a portion thereof. This movement of the log will cause the fingers 66 to revolve and as the log is severed, it will then be in a position to fall upon the grid 73 as retrograde movement of the fingers 66 is prevented by the ratchet teeth 69 and dog 68. The severed portion of the log will then move over the grid and come into contact with the stop 74. Assuming that the same power which operates the saw is causing the pitman rod 34 to move forwardly and rearwardly, the result will be that as the pusher 37 moves to its furthest position from the splitting element, the pin 83 will contact the cam 81 which will cause the fingers 78 to raise and deliver the severed portion of a log lying therein to a point on the tracks between the pusher and the splitting element. As the rotation of the crank 32 continues, the result will be that the pusher 37 will advance and force the log against the splitting element 42 with the result that the log will be split and the split portions will fall upon the conveyer 84 and be conveyed to a point remote from the machine.

It will thus be seen that I have provided a mechanism wherein the logs will be sawed and split into predetermined lengths and delivered to a distant pile with but one handling.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, the combination with parallel I beams, a saw mounted on one of said I beams, a sliding table mounted adjacent said saw, a plurality of rotatable radially disposed fingers mounted adjacent said saw and adapted to receive material from said table, a grid positioned in line with said fingers and adapted to receive a severed portion of material therefrom, means for temporarily retaining the severed portion of material during its travel thereover, and a splitting mechanism comprising a pusher and a splitting element in alignment, said splitting mechanism being adapted to receive the severed portion of material from said grid.

2. In a device of the character described, the combination with a suitable support, shafts mounted thereon, gears mounted on said shafts and adapted to mesh with one another, means for delivering power to said shafts, a crank secured to one of said shafts, a pitman secured to said crank, tracks mounted adjacent one of said supports, a pusher movably supported on said tracks and secured to said pitman, a removable splitting element mounted in alignment with said pusher, a grid extending across said support from a point adjacent said pusher at a point on the opposite side of said support, a plurality of rotatable fingers adapted to deliver material to said support, a sliding table mounted adjacent said fingers, a saw mounted between said fingers and said sliding table for the purpose of severing a portion of material extending from said table to said fingers when said table is moved so as to bring said material against said saw.

In testimony whereof I affix my signature.

KICHIMATSU MUKAI.